United States Patent Office 3,316,113
Patented Apr. 25, 1967

3,316,113
METHOD OF MOLDING CASEIN COMPOSITIONS
Egon Frankl, 77 East Blvd., Rochester, N.Y. 14610
No Drawing. Filed Jan. 14, 1965, Ser. No. 425,603
3 Claims. (Cl. 106—146)

This invention relates to the production of casein molding compositions and is particularly directed to methods wherein trioxane (trioxymethylene) is used in the production of casein molding compositions and to the compositions thereby produced.

Trioxane occurs as a colorless crystalline compound melting at 61–62° C. and boiling without decomposition at 115° C. I have found that in the molten state or in solution in organic solvents it is an excellent plasticizer for casein and that in the presence of substances acting as strong acids or releasing acid at temperatures in the neighborhood of 75–100° C., the trioxane slowly depolymerizes and liberates formaldehyde which acts as a curing agent for the casein.

The use of organic solutions of trioxane in the compositions makes it possible to greatly reduce or substantially eliminate the water content of the casein compositions in the plasticizing and curing operations and thereby results in cured casein articles of greatly improved water resistance.

The preferred organic solvents are non-aqueous organic liquids compatible with casein and having boiling points above the curing temperatures, preferably above about 135° C., such as the higher aliphatic alcohols and diols and the dialkyl formamides. Water-insoluble aliphatic alcohols and diols such as amyl alcohol, 2,2,4-trimethyl-1,3-pentanediol and mixtures thereof are particularly advantageous as solvents for the trioxane.

Particularly useful as acid releasing agents are the alkali metal bisulfates such as sodium bisulfate (NaHSO₄).

Typically, the casein is mixed with the trioxane solution and the acid releasing agent together with any fillers, coloring agents and other adjuvants common in the casein plastic art and the mixture is extruded at, for example, 40 to 50° C. The extruded material is then hot molded to a desired shape, for example, at a temperature of from about 125 to about 140° C. for about five to ten minutes and the molded articles are removed from the hot mold and cured by heating in an oven at a temperature of, for example, from about 90 to about 100° C. for at least about eight hours. Instead of hot molding the extruded material, the extruded shapes may be cured directly by heating in an oven at from about 90 to about 100° C.

The following specific examples are illustrative of the compositions and procedures of the invention, all parts being by weight.

Example I

|  | Pts. |
|---|---|
| Rennet casein (moisture content 6.4%) | 60 |
| n-Amyl alcohol | 10 |
| Trioxane | 10 |
| Water | 4 |
| Sodium bisulfate, anhydrous | 3 |

The components are mixed thoroughly, extruded and hot molded at 137° C. for eight minutes before oven curing.

Example II

|  | Pts. |
|---|---|
| Rennet casein (moisture content 6.4%) | 60 |
| Dimethylformamide | 40 |
| Trioxane | 10 |
| Water | 4 |
| Sodium bisulfate, anhydrous | 3 |

The trioxane is dissolved in the dimethylformamide and the solution is thoroughly mixed, extruded and molded at 127–130° C. for five to six minutes. The moldings are cured at 95° C. for about eight hours.

Example III

|  | Pts. |
|---|---|
| Rennet casein (moisture content 6.4%) | 60 |
| Dimethylformamide | 30 |
| Dibutylformamide | 10 |
| Trioxane | 10 |
| Water | 4 |
| Sodium bisulfate, anhydrous | 4 |

The components are mixed, molded and cured as in Example II.

Example IV

|  | Pts. |
|---|---|
| Rennet casein (moisture content 6.4%) | 500 |
| Trioxane | 200 |
| 2,2,4-trimethyl-1,3-pentanediol | 165 |
| Polyvinyl alcohol (Du Pont Elvanol Grade 51–65) | 25 |
| Ethylene glycol | 225 |
| Methylcellulose (Dow Methocel, 4000 cps.) | 25 |
| Sodium bisulfate, anhydrous | 20 |

The components are mixed and extruded as in Example II. The extrusions are molded at 122° C. for eight minutes and the moldings are cured at 95° C. for about ten hours.

It will be understood that the specific examples given above are merely illustrative of the principles of the invention and that the procedures and compositions are subjected to variations within the scope of the appended claims as will be understood by those skilled in the art of casein molding compositions.

I claim:

1. A method of forming hardened casein articles which comprises extruding a mixture comprising about 60 parts of casein, 2.4–4.0 parts of an alkali metal bisulfate and 10–24 parts of trioxane dissolved in 10–50 parts of a solvent for the trioxane, said solvent being a casein-compatible organic liquid boiling above 135° C. and selected from the group consisting of aliphatic alcohols, aliphatic diols and dialkyl formamides and curing the extrudate for at least eight hours at about 90–100° C.

2. A method according to claim 1 wherein the extrudate is hot molded at 125–140° for 5–10 minutes prior to curing.

3. A method according to claim 2 wherein the alkali metal bisulfate is sodium bisulfate.

References Cited by the Examiner

UNITED STATES PATENTS

| 1,968,991 | 8/1934 | Clickner | 106—146 |
| 2,101,574 | 12/1937 | Dangelmajer | 106—148 |
| 2,298,269 | 10/1942 | Atwood | 106—147 |
| 2,354,077 | 7/1944 | Bergen | 264—202 |
| 2,482,897 | 9/1949 | Schmutzler | 106—147 |
| 2,775,506 | 12/1956 | Wormell | 264—202 |

ALEXANDER H. BRODMERKEL, *Primary Examiner.*

D. J. ARNOLD, *Assistant Examiner.*